3,004,885
SALTS OF ALKANETHIOLS

Milton Kosmin, Dayton, Ohio, assignor to Monsanto Chemical Company, St. Louis, Mo., a corporation of Delaware
No Drawing. Filed Oct. 16, 1956, Ser. No. 616,140
6 Claims. (Cl. 167—22)

The present invention relates to organic compounds of sulfur and nitrogen and more particularly provides new salts of certain alkanethiols, the method of preparing the same and fungicidal compositions comprising the new salts.

According to the invention there are provided N-hydrocarbon polyalkylenepolyamine salts of alkanethiols, said salts having the formula

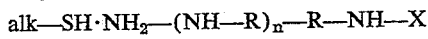

alk—SH·NH$_2$—(NH—R)$_n$—R—NH—X in which alk denotes an alkyl radical of from 1 to 8 carbon atoms, R is an alkylene radical of from 2 to 3 carbon atoms, n is an integer of 0 to 2 and X is an aliphatic hydrocarbon radical of from 8 to 18 carbon atoms.

The new salts are prepared by treating an alkanethiol of from 1 to 8 carbon atoms with a suitable N-hydrocarbon polyalkylenepolyamine. Alkanethiols useful for the present purpose include methanethiol, ethanethiol, 2-butanethiol, 3-methyl-1-butanethiol, 1-butanethiol, 1-propanethiol, 2-propanethiol, 1-pentanethiol, 2,4,4,-trimethyl-2-pentanethiol, 1-octanethiol, 2-octanethiol, 1-hexanethiol, 1-heptanethiol, 2-methyl-2-propanethiol, 2-methyl-2-butanethiol, 2-methyl-1-propanethiol, 3-octanethiol, 2-hexanethiol, 2-ethyl-1-hexanethiol, 2-methyl-1-pentanethiol, 3-hexanethiol, 4-heptanethiol, 2,2,4-trimethylpentanethiol, etc.

As examples of amines which are reacted with these alkanethiols according to the invention to give the present salts may be mentioned the following: N-octyldiethylenetriamine, N-decyltripropylenetetramine, N-n-dodecyltriethylenetetramine, N-branched chain tetradecyldipropylenetriamine, N-hexadecyldiethylenetriamine, N-octadecylpropylenediamine, N-nonylethylenediamine, N-2-(ethyl hexyl)ethylenediamine, N-(2-n-propylheptyl)dipropylenetriamine, N-(2,6,8 - trimethylnonyl)diethylenetriamine, N - keryltriethylenetetramine (where keryl denotes the mixture of alkyl radicals corresponding to the hydrocarbons of kerosene) etc.

The present amine salts are liquid to waxy or even crystalline compounds which are generally soluble in alcohol and acetone and readily dispersible in water. As will be shown hereinafter the present amine salts are characterized by high fungitoxicity. This effect is demonstrated when they are present in treating solutions in very small concentrations, e.g., in quantities of as low as, say, 10 parts per million. At higher concentrations, say at a concentration of about 1%, herbicidal properties are demonstrated.

Conversion of the alkanethiols into the present amine salts is effected by simply adding the amine to the thiol in the presence or absence of an inert diluent or solvent and allowing the resulting mixture to stand until the thiol has been converted into the salt. The diluent or solvent, if one were used, may then be removed by distillation. Depending upon the ultimate use of the salt, it is often unnecessary to separate the solvent, the crude reaction mixture being useful directly in fungi-controlling applications where the presence of a diluent used may be immaterial. Inert diluent or solvents useful in preparing the present amine salts are the lower aliphatic alcohols, e.g., ethanol and isopropanol, hydrocarbons such as benzene, kerosene, and hexane, etc.

Since formation of the salts occurs by addition of 1 mole of the N-hydrocarbon polyalkylene polyamine to 1 mole of the alkanethiol, stoichiometric proportions of the alkanethiol and the amine are advantageously employed. However, an excess of either reactant may be employed since any unreacted amine or thiol may be readily recovered from the reaction product.

The invention is further illustrated but not limited by the following examples:

Example 1

This example shows preparation of a N-dodecyldiethylenetriamine salt of 2-methyl-2-propanethiol. The dodecyl-substituted amine used was a N-keryldiethylenetriamine which had been obtained by condensing with diethylenetriamine a substantially mono-chlorinated kerosene fraction (57.4% chlorinated on a molar basis, and prepared from an unchlorinated kerosene fraction boiling at about 150–250° C.).

13.5 g. (0.15 mole) of 2-methyl-2-propanethiol was mixed with 42.5 g. (0.15 mole, based on the keryl radical as C$_{12}$) of the N-keryldiethylenetriamine. Some heat was generated. The resulting clear solution was heated to 50° C., and then allowed to cool. There was thus obtained the substantially pure N-keryldiethylenetriamine salt of 2-methyl-2-propanethiol, a viscous liquid which was soluble in alcohol and acetone and readily dispersible in water.

Example 2

This example shows testing of the N-keryldiethylenetriamine salt of 2-methyl-2-propanethiol which was prepared in Example 1 against the organisms *Stemphylium sarcinaeforme* and *Monilinia fructicola*. Respective suspensions of the organisms were prepared from 5-day old cultures thereof on slants of agar cultures by removing said spores with a rubber policeman from the slant and suspending them in distilled water. The concentration of spores was adjusted to about 40,000 per ml. of water.

A 1.0% acetone solution of the salt of Example 1 was added to water in a concentration calculated to give 1,000 parts of the salt per million parts of water. An 0.02 ml. aliquot of the resulting solution was pipetted into wells of two depressed glass slides and allowed to evaporate to dryness. Then a 0.1 ml. aliquot of each of the above spore suspension was respectively pipetted into each well. The concentration of the 2-methyl-2-propanethiol salt in each well was thus lowered to 200 parts per million parts of diluent. Two "blanks" were also prepared by pipetting respectively 0.1 ml. aliquots of the above spore suspensions into empty wells of two depressed glass slides. All of the slides were then incubated in a moist chamber for 16 hours at 25°C. Inspection of the slides at the end of this time showed no germination of either the *Stemphylium sarcinaeforme* or *Monilinia fructicola* spores in the presence of the salt, i.e., on the slides on which the N-keryldiethylenetriamine salt of 2-methyl-2-propanethiol had been deposited; whereas there was profuse spore germination on the "blanks."

Example 3

This example shows evaluation of the 2-methyl-2-propanethiol salt of Example 1 as a systemic fungicide in the control of tomato wilt.

Three two-week old Bonny Best tomato seedlings were immersed into water containing 10 parts per million of the test compound. After 48 hours the seedlings were removed and the root systems were rinsed thoroughly in tap water to remove any chemical residue. Approximately ⅓ of each lateral root system of each plant was severed and the wounded roots were dipped for 30 seconds in a bud-cell suspension of *Fusarium oxysporum* f. *lycopersici*. The thus inoculated plants were then potted in 4-inch clay pots of steamed-soil. "Blanks" were prepared by similarly inoculating and potting tomato seedlings which had not been exposed to the salt. The potted plants were then set in the greenhouse for observation.

Marked Fusarium wilt symptoms were noted on the "blanks," whereas the plants which had been treated with the polyalkylenepolyamine appeared to be in excellent condition. At this time disease incidence in the plants which had been immersed in the 2-methyl-2-propanethiol N-keryldiethylenetriamine salt was investigated by cross-sectioning the stem of each of the treated and inoculated plants and examing them for vascular browning. No vascular discoloration was noted. Similar examination of the "blanks" showed pronounced browning.

Salts of 2-methyl-2-propanethiol or of other alkanethiols having from 1 to 8 carbon atoms with present N-hydrocarbon polyalkylenepolyamines are generally efficient against fungi. The salt of 2-methyl-2-propanethiol and N-(tetrapropylene)diethylenetriamine or the salt of 1-propanethiol, 2-butanethiol, or 1-octanethiol and N-n-dodecyl, N-hexadecyl, or N-octyltriethylenetetramine possess pronounced fungistatic effect. Said salts are readily obtainable by simply mixing the appropriate alkanethiol with the polyamine in the presence or absence of an inert diluent and at ordinary or somewhat elevated temperatures.

The present salts are highly efficient for preventing or retarding fungus growth on plants, fruits, seeds, soils, furs, leather, cotton, wood and organic material in general. They may be applied directly to the organic material which is to be treated, but because the present salts are effective in extremely dilute concentrations, it is preferred to incorporate the present agents with a carrier or a diluent.

Solutions of the salts may be employed in the absence of any dispersant; however, for many purposes the addition of a dispersing agent is preferred in that better adhesion or penetration of the treating solution is obtained. As dispersing agents there may be used, e.g., alkali metal salts of higher alkyl sulfosuccinates, the higher alkylbenzenesulfonates, polyalkylene glycol ethers of long chained alcohols, etc.

Fungistatic or fungicidal dusts may be prepared by mixing the present salts with dusting materials such as talc, clay, lime, bentonite, pumice, fuller's earth, etc.

Compositions comprising the present N-hydrocarbon polyalkylenepolyamine salts of the alkanethiols may be applied only to the surface of the material to be protected against fungi as when treating foliage, furs, leather and other comparatively impregnable material upon which fungus growth is to be prevented or retarded. In other cases, for example, when it is desired to protect seeds from soil microorganisms harmful to the seeds and plants, the present salts, preferably incorporated with a solid carrier, may be mixed with the seed. Impregnation of textiles with the salts is advantageously effected by immersion in solutions of these compounds in the presence or absence of a wetting-out agent.

What I claim is:

1. The method which comprises contacting an alkanethiol of the formula alk-SH in which alk denotes an alkyl radical of from 1 to 8 carbon atoms, with an amine of the formula $H_2N-(NH-R)_n-R-NHX$, in which R is an alkylene radical of from 2 to 3 carbon atoms, $n$ is an integer of 0 to 2, and X is an alkyl radical of from 8 to 18 carbon atoms, and recovering from the resulting reaction product a salt of the formula $$alk-SH \cdot H_2N-(NH-R)_n-R-NHX$$

in which alk, R, $n$ and X are as herein defined.

2. The method which comprises contacting 2-methyl-2-propanethiol with mono-N-keryldiethylenetriamine wherein keryl denotes the mixture of alkyl radicals corresponding to the hydrocarbons of a kerosene fraction boiling at 150 to 250° C. and recovering from the resulting reaction product the salt of said thiol with said mono-N-keryldiethylenetriamine wherein the keryl radical is as herein defined.

3. A salt of the formula $$alk-SH \cdot NH_2-(NH-R)_nR-NH-X$$

in which alk denotes an alkyl radical of from 1 to 8 carbon atoms, R is an alkylene radical of from 2 to 3 carbon atoms, $n$ is an integer of 0 to 2 and X is an alkyl radical of from 8 to 18 carbon atoms.

4. The salt of 2-methyl-2-propanethiol and mono-N-keryldiethylenetriamine wherein keryl denotes the mixture of alkyl radicals corresponding to the hydrocarbons of a kerosene fraction boiling at about 150 to 250° C.

5. The method of combatting fungi which comprises exposing said fungi to a fungitoxic quantity of a composition comprising as the essential effective ingredient a salt of the formula $$alk-SH \cdot H_2N-(NH-R)_n-R-NHX$$

in which alk denotes an alkyl radical of from 1 to 8 carbon atoms, R is an alkylene radical of from 2 to 3 carbon atoms, $n$ is an integer of 0 to 2 and X is an alkyl radical of from 8 to 18 carbon atoms.

6. The method of combatting fungi which comprises exposing said fungi to a fungitoxic quantity of a composition comprising as the essential effective ingredient the salt of 2-methyl-2-propanethiol and mono-N-keryldielenetriamine wherein the keryl radical denotes the mixture of alkyl radicals corresponding to the hydrocarbons of a kerosene fraction boiling at 150 to 250° C.

References Cited in the file of this patent

UNITED STATES PATENTS

| | | |
|---|---|---|
| 2,244,712 | Kyrides | June 10, 1941 |
| 2,246,524 | Kyrides | June 24, 1941 |
| 2,267,204 | Kyrides | Dec. 23, 1941 |
| 2,271,378 | Searle | Jan. 27, 1942 |
| 2,304,623 | Berchet | Dec. 8, 1942 |
| 2,356,171 | Mathes | Aug. 22, 1944 |
| 2,358,786 | Bugert | Sept. 26, 1944 |
| 2,378,269 | Watt | June 12, 1945 |
| 2,687,348 | Kosmin | Aug. 24, 1954 |
| 2,748,139 | Scucli | May 26, 1956 |
| 2,762,697 | Doerr | Sept. 11, 1956 |

OTHER REFERENCES

Roark et al.: U.S. Department of Agriculture, Bull. No. 162 (1929), pages 32–33.

Karrer: Organic Chemistry (1938), page 108 (Nordeman Publishing Co., Inc., New York).

UNITED STATES PATENT OFFICE

CERTIFICATE OF CORRECTION

Patent No. 3,004,885                 October 17, 1961.

Milton Kosmin

It is hereby certified that error appears in the above numbered patent requiring correction and that the said Letters Patent should read as corrected below.

Column 2, line 3, for "ohployed" read -- employed --; line 43, for "suspension" read -- suspensions --; column 3, line 10, for "examing" read -- examining --; column 4, lines 38 and 39 for "mono-N-keryldielenetriamine" read -- mono-N-keryldiethylenetriamine --.

Signed and sealed this 3rd day of April 1962.

(SEAL)
Attest:

ERNEST W. SWIDER                       DAVID L. LADD
Attesting Officer                         Commissioner of Patents